US011856482B2

(12) United States Patent
Taira et al.

(10) Patent No.: US 11,856,482 B2
(45) Date of Patent: Dec. 26, 2023

(54) MOBILE APPARATUS, MAP MANAGEMENT APPARATUS, POSITIONING SYSTEM, CONTROL CIRCUIT, AND RECORDING MEDIUM

(71) Applicant: MITSUBISHI ELECTRIC CORPORATION, Tokyo (JP)

(72) Inventors: Akinori Taira, Tokyo (JP); Seiji Kozaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 422 days.

(21) Appl. No.: 17/034,668

(22) Filed: Sep. 28, 2020

(65) Prior Publication Data

US 2021/0014642 A1 Jan. 14, 2021

Related U.S. Application Data

(63) Continuation of application No. PCT/JP2018/014306, filed on Apr. 3, 2018.

(51) Int. Cl.
*H04W 4/02* (2018.01)
*G01C 21/00* (2006.01)
(Continued)

(52) U.S. Cl.
CPC ............ *H04W 4/027* (2013.01); *G01C 21/32* (2013.01); *G01C 21/3844* (2020.08); *G05D 1/0274* (2013.01)

(58) Field of Classification Search
CPC ...... H04W 4/027; H04W 4/026; G01C 21/32; G01C 21/3844; G01C 21/3811; G05D 1/0274; G01S 19/48
See application file for complete search history.

(56) References Cited

U.S. PATENT DOCUMENTS 10,856,106 B1 * 12/2020 Ganesan ............. H04W 64/003
2008/0071475 A1 3/2008 Takaoka
(Continued)

FOREIGN PATENT DOCUMENTS

JP 2008-58186 A 3/2008
JP 5051857 B2 10/2012
(Continued)

OTHER PUBLICATIONS

Indian Office Action for Indian Application No. 202047041154, dated Aug. 27, 2021, with an English translation.
(Continued)

*Primary Examiner* — Rami Khatib
*Assistant Examiner* — Shahira Baajou
(74) *Attorney, Agent, or Firm* — BIRCH, STEWART, KOLASCH & BIRCH, LLP (57) ABSTRACT

A mobile apparatus according to the disclosure includes: a sensor unit to calculate a moving distance and a moving direction; a positioning unit to calculate a first current position by using positioning information for positioning provided in a calibration area that is among areas in which the positioning information is provided, the calibration area being the area in which first reliability representing accuracy of the positioning information is equal to or higher than a first threshold; a current position calculation unit to estimate a second current position by using the moving distance and the moving direction calculated by the sensor unit; and a calibration unit to calibrate a parameter to be used to estimate the second current position in the current position calculation unit, by using the first current position.

10 Claims, 6 Drawing Sheets

(51) Int. Cl.
*G01C 21/32* (2006.01)
*G05D 1/02* (2020.01)

(56) References Cited

U.S. PATENT DOCUMENTS

2017/0153110 A1   6/2017  Matsushita
2020/0198367 A1*  6/2020  Zhang .................. B41J 3/4073

FOREIGN PATENT DOCUMENTS

| | | |
|---|---|---|
| JP | 2016-192028 A | 11/2016 |
| JP | 6086203 B2 | 3/2017 |
| JP | 2017-72437 A | 4/2017 |
| JP | 2017-106891 A | 6/2017 |

OTHER PUBLICATIONS

Chinese Office Action and Search Report for corresponding Chinese Application No. 201880091368.X, dated Sep. 9, 2023, with English translation.

* cited by examiner

COORDINATE SYSTEM ON MAP

COORDINATE SYSTEM OF BUILT-IN SENSOR

MOBILE APPARATUS, MAP MANAGEMENT APPARATUS, POSITIONING SYSTEM, CONTROL CIRCUIT, AND RECORDING MEDIUM

CROSS-REFERENCE TO RELATED APPLICATION

This application is a continuation application of International Application PCT/JP2018/014306, filed on Apr. 3, 2018, and designating the U.S., the entire contents of which are incorporated herein by reference.

BACKGROUND OF THE INVENTION

1. Field of the Invention

The disclosure relates to a mobile apparatus that measures a position, a map management apparatus that provides information to the mobile apparatus, and a positioning system that provides a positioning service to the mobile apparatus, a control circuit, and a recording medium.

2. Description of the Related Art

In recent years, there has been a movement to perform highly accurate positioning of an outdoor mobile apparatus such as a vehicle, a robot, or a terminal by using a global positioning system (GPS), a quasi-zenith satellite system equipped with positioning satellites, and the like so that a positioning result is used to achieve advanced and automatized surveying. It has been difficult to control a mobile apparatus by relying on information from a satellite positioning system used in a conventional car navigation system and the like. This is because a position estimation error of about several meters remains in the satellite positioning system. A quasi-zenith satellite scheduled to start operation in fiscal year 2018 has a mechanism for enabling a position estimation error to be reduced to approximately 10 cm. Thus, it is expected to develop new fields of application of the quasi-zenith satellite, such as the automated driving of a vehicle and the automatic control of a robot.

Meanwhile, it is difficult to operate a satellite positioning system in an indoor or underground space where a positioning satellite cannot be visually recognized, under an elevated structure where a mobile apparatus is shielded from a positioning satellite, or in the middle of a city such as a place between buildings. Therefore, in order to deploy a seamless positioning service indoors and outdoors, it is necessary to separately provide an independent system for deploying the positioning service indoors. As a typical indoor positioning system, tag systems using short-range wireless such as an indoor messaging system (IMES) and Bluetooth (registered trademark) have been put to practical use. In these tag systems, a wireless tag that transmits a weak wireless signal is installed at a specific point, and if a mobile apparatus can receive the wireless signal, it is determined that the mobile apparatus is located in the vicinity of the wireless tag. Generally, even a weak wireless signal can be transmitted several meters. Therefore, the position of the mobile apparatus is specified in units of ranges in which signals can be transmitted from wireless tags. Thus, a distance over which a signal can be transmitted from a wireless tag coincides with the maximum value of the position estimation error.

In the indoor positioning system described above, the position estimation error increases as the communication range of the tag is expanded. Therefore, in order to reduce the position estimation error, it is unavoidable to reduce a transmittable range for each single wireless tag. Accordingly, numerous wireless tags are necessary for deploying a planar positioning service. In order to solve this problem, Japanese Patent Application Laid-open No. 2017-106891 discloses a method of combining pedestrian dead reckoning (PDR) and a wireless tag.

In order to implement a planar positioning service, the position of a mobile apparatus is estimated by use of the result of detection by a motion sensor mounted on the mobile apparatus in the method described in Japanese Patent Application Laid-open No. 2017-106891. The motion sensor is a sensor in which inertial navigation sensors such as a gyroscope sensor, an acceleration sensor, and a geomagnetic sensor are integrated. However, a position estimation error is large in a motion sensor to be mounted on a particularly inexpensive consumer product. Thus, it is necessary to correct a position after moving a certain distance. In the method described in Japanese Patent Application Laid-open No. 2017-106891, an area where a GPS can be used and an area where a signal from a wireless tag can be received are defined, and current position information is corrected by use of position information obtained from the GPS, the wireless tag, and the like outside the mobile apparatus. More precisely, in the method described in Japanese Patent Application Laid-open No. 2017-106891, an estimated value of an azimuth such as a yaw angle obtained by the motion sensor and a moving distance are corrected by use of the position information obtained from outside the mobile apparatus and a Kalman filter algorithm.

However, although error correction of the estimated value obtained by the motion sensor is performed in the method described in Japanese Patent Application Laid-open No. 2017-106891, it is unclear to what extent an error can be corrected. Thus, there has been a problem in that the accuracy of position estimation deteriorates if correction is performed by use of a correction method with unclear error correction accuracy.

The disclosure has been made in view of the above, and an object of the present disclosure is to obtain a mobile apparatus capable of preventing deterioration in accuracy of position estimation.

SUMMARY OF THE INVENTION

To solve the aforementioned problems and achieve the object, a mobile apparatus according to an aspect of the disclosure includes: a sensor unit to calculate a moving distance and a moving direction; a positioning unit to calculate a first current position by using positioning information for positioning provided in a calibration area that is among areas in which the positioning information is provided, the calibration area being the area in which first reliability representing accuracy of the positioning information is equal to or higher than a first threshold; a current position calculation unit to estimate a second current position by using the moving distance and the moving direction calculated by the sensor unit; and a calibration unit to calibrate a parameter to be used to estimate the second current position in the current position calculation unit, by using the first current position.

DETAILED DESCRIPTION OF THE PREFERRED EMBODIMENTS

Hereinafter, mobile apparatuses, map management apparatuses, positioning systems, a control circuit, and a recording medium according to embodiments of the disclosure will be described in detail with reference to the drawings.

First Embodiment

Figure 1:
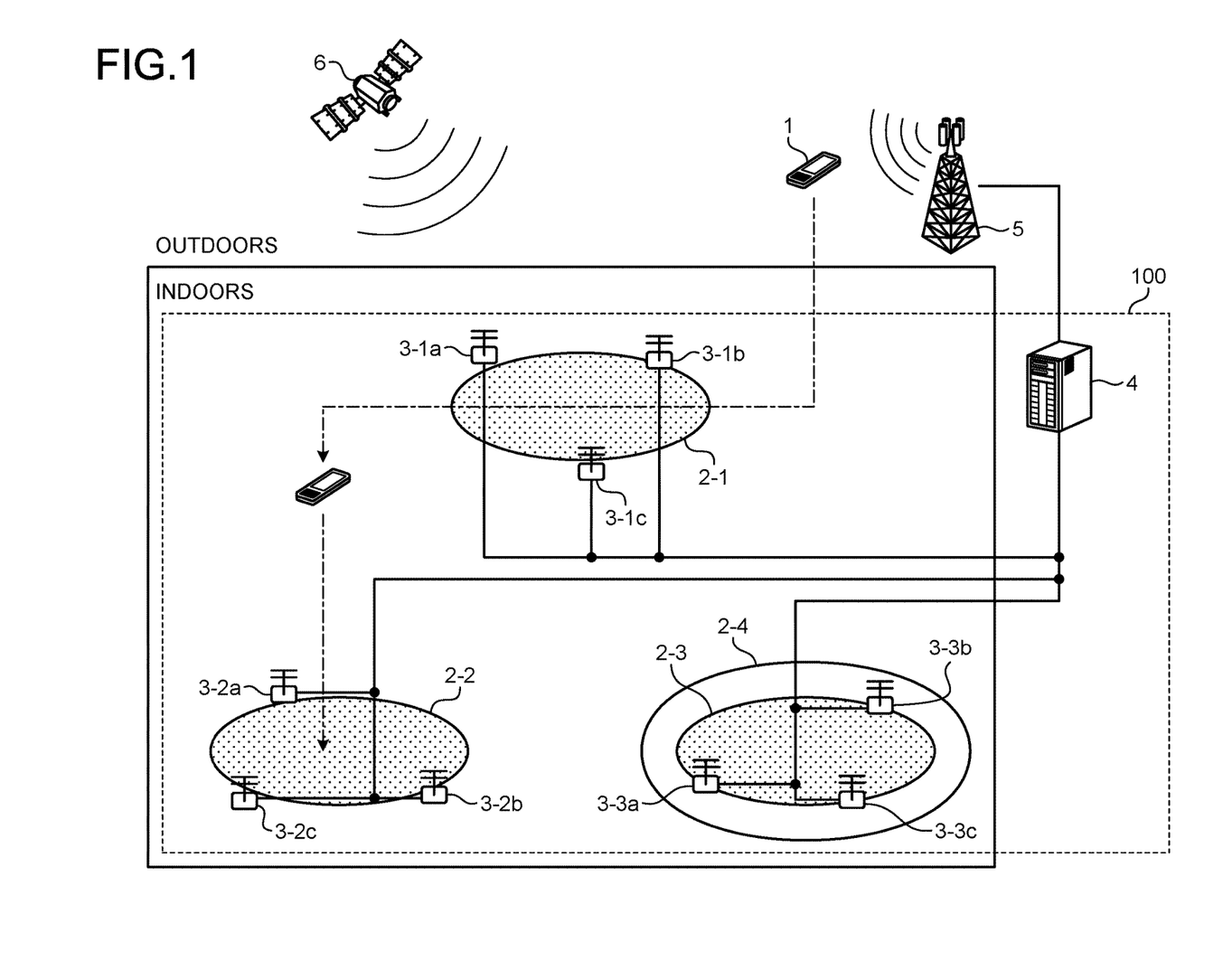
FIG. 1 is a diagram illustrating a mobile apparatus, a positioning system, a base station, and a positioning satellite according to a first embodiment.

FIG. 1 is a diagram illustrating a mobile apparatus, a positioning system, a base station, and a positioning satellite according to a first embodiment. A mobile apparatus 1 performs highly accurate position estimation outdoors by using a positioning satellite 6 such as a quasi-zenith satellite. As indicated by an alternate long and short dash line in FIG. 1, when the mobile apparatus 1 moves from the outdoors to an indoor space where communication with the positioning satellite 6 cannot be performed, the mobile apparatus 1 calculates a relative position with respect to a reference point, which is a most recent observation position where the mobile apparatus 1 observed the positioning satellite 6, by using a sensor, and estimates a current position. That is, the most recent observation position is a position where the mobile apparatus 1 most recently received a signal from the positioning satellite 6 and performed positioning outdoors. Note that although the mobile apparatus 1 is described as a terminal in FIG. 1, the mobile apparatus 1 may be, for example, a robot, and is not limited to the terminal.

A positioning system 100 includes positioning devices 3-1a to 3-1c, positioning devices 3-2a to 3-2c, positioning devices 3-3a to 3-3c, and a map management apparatus 4. The positioning devices 3-aa to 3-1c, the positioning devices 3-2a to 3-2c, and the positioning devices 3-3a to 3-3c are referred to as positioning devices 3 when described without distinction. A positioning area 2-1 is formed by the positioning devices 3-1a to 3-1c installed above the ground as illustrated in FIG. 1. Similarly, a positioning area 2-2 is formed by the positioning devices 3-2a to 3-2c installed as illustrated in FIG. 1. A positioning area 2-3 is formed by the positioning devices 3-3a to 3-3c installed as illustrated in FIG. 1. In addition, a positioning area 2-4 is formed concentrically outside the positioning area 2-3. The positioning area 2-1, the positioning area 2-2, and the positioning area 2-3 are referred to as positioning areas 2 when described without distinction. The positioning areas 2 are each an area where information for positioning is distributed so that the mobile apparatus 1 can perform positioning even in, for example, an area where the positioning satellite 6 is invisible. The positioning areas 2 are each a calibration area. The calibration area is an area where it is possible to provide information for achieving highly accurate positioning, and an area where a system is provided which implements, for example, time difference of arrival positioning using a plurality of wide band radio beacons or a method of calculating a position by reading a single or multiple markers with a camera. Positions of the wide band radio beacons and positions of the markers are displayed on a dynamic map. Sufficiently high positioning accuracy can be provided if a target area is small in methods such as the time difference of arrival positioning method using a plurality of wide band radio beacons and the positioning method in which a camera reads a single or multiple markers to calculate a position. The positioning devices 3 provide positioning information necessary for the mobile apparatus 1 in performing positioning in the respective calibration areas. In the present embodiment, a positioning method to be implemented by use of the positioning devices 3 is not limited as long as the mobile apparatus 1 can perform measurement with high accuracy. Note that the positioning area 2-4 is not a calibration area.

FIG. 1 illustrates the positioning devices 3-1a to 3-1c, the positioning devices 3-2a to 3-2c, and the positioning devices 3-3a to 3-3c. However, the number of the positioning devices 3 is not limited to nine in the present embodiment. The positioning device 3 is a wireless communication device in the present embodiment. However, the positioning device 3 is not limited to the wireless communication device as long as the positioning device 3 is a device that can communicate with the mobile apparatus 1 and can provide information necessary for the mobile apparatus 1 in performing positioning. The map management apparatus 4 provides the mobile apparatus 1 with the dynamic map. A base station 5 is a base station in a wide area cellular network, and wirelessly communicates with the mobile apparatus 1.

The dynamic map will be described. The dynamic map includes maps stratified according to the speed of change in the positions of planimetric features such as rivers, mountains, plants, bridges, railroads, and buildings. The dynamic map is used when the automated driving of a vehicle or the automatic control of a device is performed. For example, a dynamic map for the automated driving of a vehicle includes four layers of maps. A first-layer (static information) map contains road map information (routes, white lines, stop lines, signboards, and the like) that changes on a monthly basis. A second-layer (quasi-static information) map contains, and the like that change on an hourly basis or a day-to-day basis. A third-layer (quasi-dynamic information) map contains signal information, electronic toll collection system (ETC) gate opening/closing information, and the like that change on a second-by-second basis. A fourth-layer (dynamic information) map contains nearby vehicle position information, nearby vehicle speed information, pedestrian position information, and the like that change on the millisecond time scale. Among information contained in the dynamic map of the present embodiment, static information corresponding to a building structure may be stored in advance in the mobile apparatus 1, or may be provided to the mobile apparatus 1 from the network.

Figure 2:
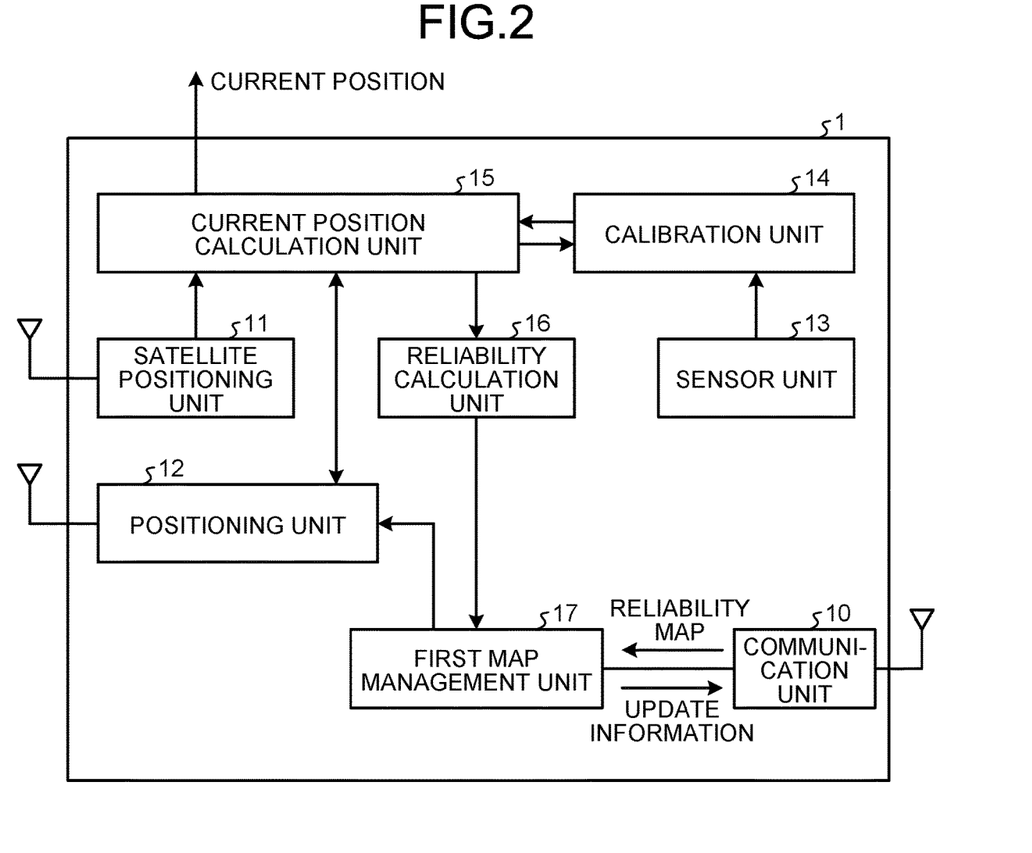
FIG. 2 is a diagram illustrating functional blocks of the mobile apparatus according to the first embodiment.

FIG. 2 is a diagram illustrating functional blocks of the mobile apparatus 1 according to the first embodiment. The mobile apparatus 1 includes a communication unit 10, a satellite positioning unit 11, a positioning unit 12, a sensor unit 13, a calibration unit 14, a current position calculation unit 15, a reliability calculation unit 16, and a first map management unit 17.

The communication unit 10 performs wireless communication with the map management apparatus 4. The satellite positioning unit 11 wirelessly communicates with the positioning satellite 6, receives a positioning signal from the positioning satellite 6, and calculates a position by using the positioning signal. The positioning unit 12 receives a signal necessary for calculation of a position of the mobile apparatus 1 from the positioning device 3, and calculates the position by using this signal. The position calculated by the positioning unit 12 is also referred to as a first current position. The sensor unit 13 includes a gyroscope sensor or an acceleration sensor, and is incorporated in the mobile apparatus 1.

Furthermore, the sensor unit 13 uses these sensors to calculate a motion vector, a moving distance, and a moving direction in a sensor coordinate system, and outputs calculation results to the calibration unit 14. The calibration unit 14 converts the motion vector calculated by the sensor unit 13 into a motion vector on the dynamic map managed by the current position calculation unit 15, and outputs the converted motion vector to the current position calculation unit 15. The current position calculation unit 15 manages a current position on the dynamic map by using at least either information on the position calculated by the positioning unit 12 or information on the motion vector output by the calibration unit 14. The current position calculated by the current position calculation unit 15 is also referred to as a second current position.

Figure 3:
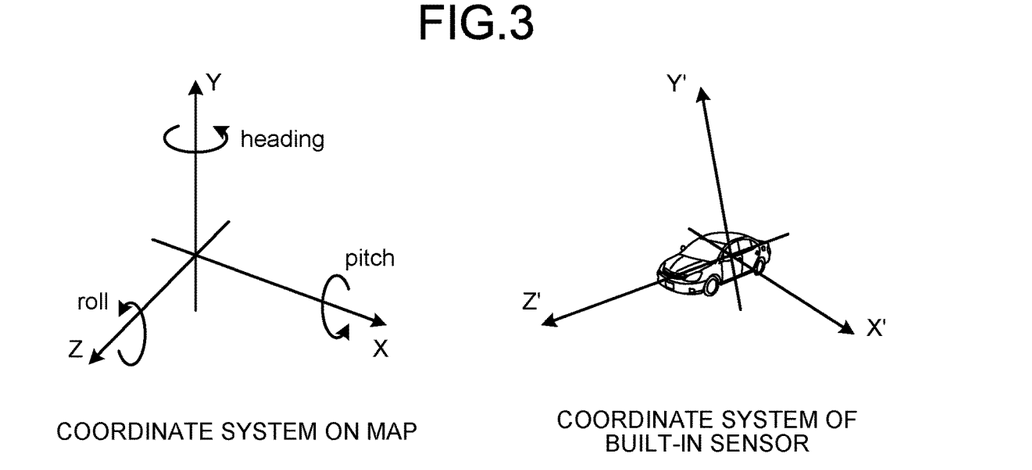
FIG. 3 is a diagram illustrating examples of a coordinate system on a dynamic map managed by a current position calculation unit and a coordinate system of a sensor unit according to the first embodiment.

Described below is a coordinate error caused by a difference between a coordinate system on the dynamic map managed by the current position calculation unit 15 and the coordinate system of the sensor unit 13. The sensor unit 13 is generally installed by being fixed to the housing of the mobile apparatus 1. Thus, the coordinate system of the sensor unit 13 changes according to the orientation of the mobile apparatus 1. FIG. 3 is a diagram illustrating examples of the coordinate system on the dynamic map managed by the current position calculation unit 15 and the coordinate system of the sensor unit 13 according to the first embodiment. In FIG. 3, the coordinate system (X, Y, Z) on the dynamic map managed by the current position calculation unit 15 and the coordinate system (X', Y', Z') managed by the sensor unit 13 do not match. The calibration unit 14 manages the error due to the difference between the coordinate system on the dynamic map and the coordinate system of the sensor unit 13, converts the motion vector output from the sensor unit 13 into a motion vector on the dynamic map, and output, to the current position calculation unit 15, the motion vector output from the sensor unit 13 and converted by the calibration unit 14. The current position calculation unit 15 manages the position of the mobile apparatus 1 on the dynamic map by adding the motion vector output by the calibration unit 14 to a motion vector on the dynamic map.

The reliability calculation unit 16 calculates the reliability of information transmitted from the positioning device 3. Furthermore, the reliability calculation unit 16 also calculates and manages the reliability of the position calculated by use of the sensor unit 13. The reliability of the position to be calculated by use of the sensor unit 13 decreases as distance to be traveled from the time of error correction at which the calibration unit 14 corrects the error of the sensor unit 13 increases. In addition, the reliability of the position calculated by use of the sensor unit 13 decreases as a longer time elapses from the time of error correction. The reliability of the information transmitted from the positioning device 3 is also referred to as first reliability. The reliability of the position calculated by use of the sensor unit 13 is also referred to as second reliability. The first map management unit 17 manages a dynamic map around the location of the mobile apparatus 1 and the first reliability on the dynamic map. A wide area dynamic map and wide area first reliability information are managed by the map management apparatus 4. A map obtained as a result of mapping the first reliability on the dynamic map is referred to as a reliability map. The mobile apparatus 1 acquires the reliability map from the map management apparatus 4.

The first reliability will be described. The accuracy of positioning using the positioning device 3 varies depending on a method and the like of positioning by the positioning device 3. The first reliability is a numerical value representing positioning accuracy of a position obtained by use of the positioning device 3. In many cases, there is little temporal change in the first reliability. Thus, there are cases where the first reliability is set when the positioning device 3 is installed and the map management apparatus 4 manages the first reliability in the form of a first reliability map in advance. The positioning area 2 is an area in which the first reliability is equal to or higher than a first threshold and a certain degree of position accuracy is guaranteed.

Figure 4:
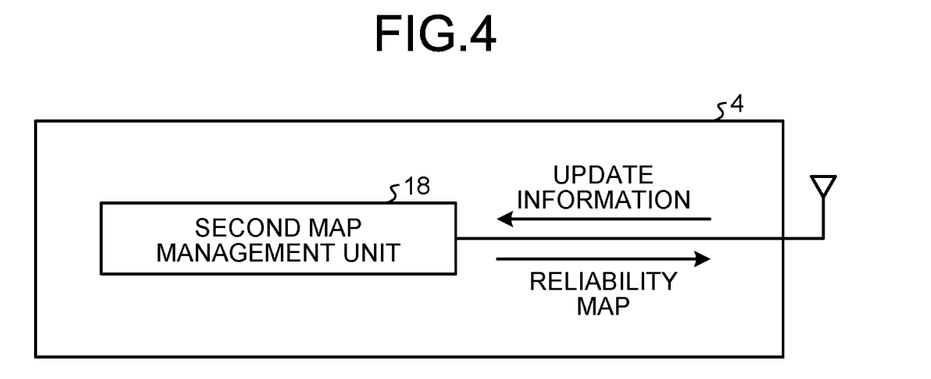
FIG. 4 is a diagram illustrating functional blocks of a map management apparatus according to the first embodiment.

FIG. 4 is a diagram illustrating functional blocks of the map management apparatus 4 according to the first embodiment. The map management apparatus 4 includes a second map management unit 18. The second map management unit 18 communicates with the mobile apparatus 1 via the positioning device 3 or the base station 5. Furthermore, the second map management unit 18 and the mobile apparatus 1 transmit/receive the reliability map to/from each other.

The communication unit 10, the satellite positioning unit 11, the positioning unit 12, the sensor unit 13, the calibration unit 14, the current position calculation unit 15, the reliability calculation unit 16, the first map management unit 17, and the second map management unit 18 according to the first embodiment are implemented by processing circuitry as an electronic circuit that performs each process.

The present processing circuitry may be dedicated hardware or a control circuit including a memory and a central processing unit (CPU) that executes a program stored in the memory. Here, the memory corresponds to, for example, a nonvolatile or volatile semiconductor memory, such as a random access memory (RAM), a read only memory (ROM), or a flash memory, a magnetic disk, or an optical disk. In the case where the present processing circuitry is a control circuit including a CPU, the control circuit is exemplified by a control circuit 200 with a configuration illustrated in FIG. 5.

Figure 5:
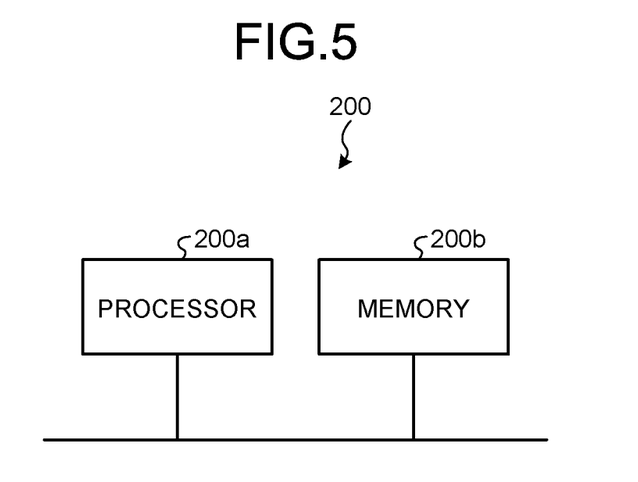
FIG. 5 is a diagram illustrating a control circuit.

As illustrated in FIG. 5, the control circuit 200 includes a processor 200a, which is a CPU, and a memory 200b. In the case where the above-described functional units are implemented by the control circuit 200 illustrated in FIG. 5, these units are implemented by the processor 200a reading and executing a program corresponding to each process, stored in the memory 200b. In addition, the memory 200b is also used as a temporary memory in each process to be performed by the processor 200a.

The operation of the mobile apparatus 1 and the positioning system 100 according to the first embodiment will be described. The operation of the mobile apparatus 1 differs between the case where the mobile apparatus 1 is located outdoors and the case where the mobile apparatus 1 is located indoors. In the case where the mobile apparatus 1 is located outdoors, the satellite positioning unit 11 receives a positioning signal from the positioning satellite 6 outdoors. In addition, the satellite positioning unit 11 calculates a current position by using the received signal. The current position calculation unit 15 uses information on the position calculated by the satellite positioning unit 11 to manage a current position on the dynamic map. At this time, the current position calculation unit 15 matches coordinates calculated by the satellite positioning unit 11 with coordinates on the dynamic map. As a method of matching the coordinates, there can be cited a method of matching the coordinates by using, for example, a coordinate system of latitude, longitude, and altitude common to the positioning satellite 6 and the current position calculation unit 15. In the case where the mobile apparatus 1 moves to an indoor space and the positioning satellite 6 becomes invisible, the current position calculation unit 15 performs positioning by using the sensor unit 13 with a position obtained from the positioning satellite 6 as a reference point, and calculates a current position by using the result of positioning.

The positioning unit 12 acquires positioning information in the case where after the mobile apparatus 1 moves to an indoor space, it is recognized that the mobile apparatus 1 has entered the positioning area 2, that is, it is determined that a current position is within the positioning area 2 by use of the first reliability and the current position obtained as a result of performing positioning by use of the sensor unit 13 with the position obtained from the positioning satellite 6 as the reference point. The positioning information acquired by the positioning unit 12 is transmitted to the current position calculation unit 15, so that a current position on the dynamic map is calculated by use of the positioning information. In the case where the positioning device 3 is, for example, a wide band radio beacon, this operation corresponds to receiving a positioning signal from the positioning device 3 and calculating a current position of the mobile apparatus 1. Furthermore, in the case of the marker reading method, this operation corresponds to reading the marker of the positioning device 3 with a camera mounted on the mobile apparatus 1 and analyzing a camera image to calculate a current position of the mobile apparatus 1. Note that the positioning unit 12 may perform indoor positioning only once when the mobile apparatus 1 is in the positioning area 2, or may perform indoor positioning a plurality of times when the mobile apparatus 1 is in the positioning area 2.

In the case where the mobile apparatus 1 enters the positioning area 2 and then moves outside the positioning area 2, the current position calculation unit 15 performs positioning by using the sensor unit 13 with a position obtained from the positioning device 3 as a reference point. Then, the current position calculation unit 15 calculates a current position by using the result of positioning. In the case where the satellite is temporarily visible, the satellite positioning unit 11 operates, so that positioning information is transmitted to the current position calculation unit 15 and a current position on the dynamic map is calculated.

When the mobile apparatus 1 enters the positioning area 2 from outside the positioning area 2, there may be an error between a first positioning result and a second positioning result. The first positioning result is calculated by use of the sensor unit 13 with a position obtained from the positioning satellite 6 or the positioning device 3 as a reference point. The second positioning result is obtained by the positioning device 3 immediately after entering the positioning area 2. This error is considered to be an error between coordinates in the dynamic map coordinate system and the sensor coordinate system, or an error caused by individual differences in the acceleration sensor and the gyroscope sensor. Therefore, the calibration unit 14 compares the first positioning result and the second positioning result to perform calibration. Calibration refers to correction of a discrepancy between the dynamic map coordinate system and the sensor coordinate system. A parameter for correcting the error due to the discrepancy between the dynamic map coordinate system and the sensor coordinate system is an example of a parameter to be used for estimating a current position in the current position calculation unit 15. Assume the case where, for example, a coordinate value P is calculated as the coordinate value of the mobile apparatus 1 in the first positioning result and a coordinate value Q is calculated as the coordinate value of the mobile apparatus 1 in the second positioning result. In such a case, the calibration unit 14 calculates a correction value such that the coordinate value P equals the coordinate value Q. Generally, the correction value is calculated as a result of calculating the coordinate value P and the coordinate value Q two or more times (using the fact that a movement of P1→P2 is the same vector as a movement of Q1→Q2). The calibration unit 14 corrects the error between the first positioning result and the second positioning result by adding the correction value to a value calculated by the sensor unit 13. Furthermore, this error correction may include correction of an individual difference in the acceleration sensor or the gyroscope sensor.

In the case where the mobile apparatus 1 is located in a place where the first reliability of the positioning device 3 is low, the current position calculation unit 15 may calculate a current position by assigning weights to a position calculated by the sensor unit 13 via the calibration unit 14 and a position calculated by the positioning unit 12 and combining the weighted positions. The place where the first reliability of the positioning device 3 is low is also referred to as a third current position. As a method of the weighted combination, there can be cited a method of, for example, assigning weights to positions such that priority is given to the position calculated by the sensor unit 13 via the calibration unit 14 and combining the positions to obtain a current position in which priority is given to the position calculated by the sensor unit 13 via the calibration unit 14, in the case where positioning information is acquired from an area, such as the positioning area 2-4, where the first reliability is lower than a certain value.

A method of updating the reliability map will be described. The distribution of the first reliability on the reliability map may change due to, for example, changes in a radio wave propagation environment around the positioning device 3. In addition, there may be a case where it is difficult to perform an extensive examination of the first reliability when the positioning device 3 is installed. In these cases, the reliability map needs to be updated. The positioning information calculated by the sensor unit 13 via the calibration unit 14 is considered to be sufficiently accurate immediately after error correction. That is, when the second reliability is equal to or higher than a second threshold, the current position calculation unit 15 outputs, to the reliability calculation unit 16, current position information (referred to as a calculation result A) calculated by the positioning unit 12 and current position information (referred to as a calculation result B) obtained as a result of adding a motion vector output from the calibration unit 14 to a position previously calculated by the positioning unit 12. The reliability calculation unit 16 calculates the first reliability of the positioning device 3 by using the second reliability and the result of comparison between the calculation result A and the calculation result B. The calculated first reliability is transmitted to the first map management unit 17 to update the reliability map, and is also transmitted as update information to the second map management unit 18 via the communication unit 10, so that the map management apparatus 4 enables information to be shared with another mobile apparatus.

As described above, in the present embodiment, when the mobile apparatus 1 can be provided with a positioning service in the positioning area 2 by using the first reliability, the mobile apparatus 1 obtains positioning information. Thus, deterioration in the estimation accuracy of the position information can be prevented. In addition, the calibration unit 14 calibrates the error caused by the difference in coordinate system between the current position calculation unit 15 and the sensor unit 13. As a result of the calibration, it is possible to prevent deterioration in the estimation accuracy of the position information. Furthermore, the reliability calculation unit 16 updates the first reliability by using the second reliability. Thus, even in the case where the first reliability changes due to, for example, changes in the radio wave propagation environment, it is possible to acquire position information only in an area where the first reliability is equal to or higher than the first threshold by updating information on the first reliability. As a result, it is possible to prevent deterioration in the estimation accuracy of the position information. Note that the example in which the positioning area 2 is formed in an indoor environment has been described in the present embodiment. However, the positioning area 2 may be formed, for example, underground where a satellite is invisible, outdoors where roofs, scaffolding on a construction site, and the like exist, or under the sea. Thus, the positioning area 2 is not limited to an indoor area or an area above the ground.

Second Embodiment

Figure 6:
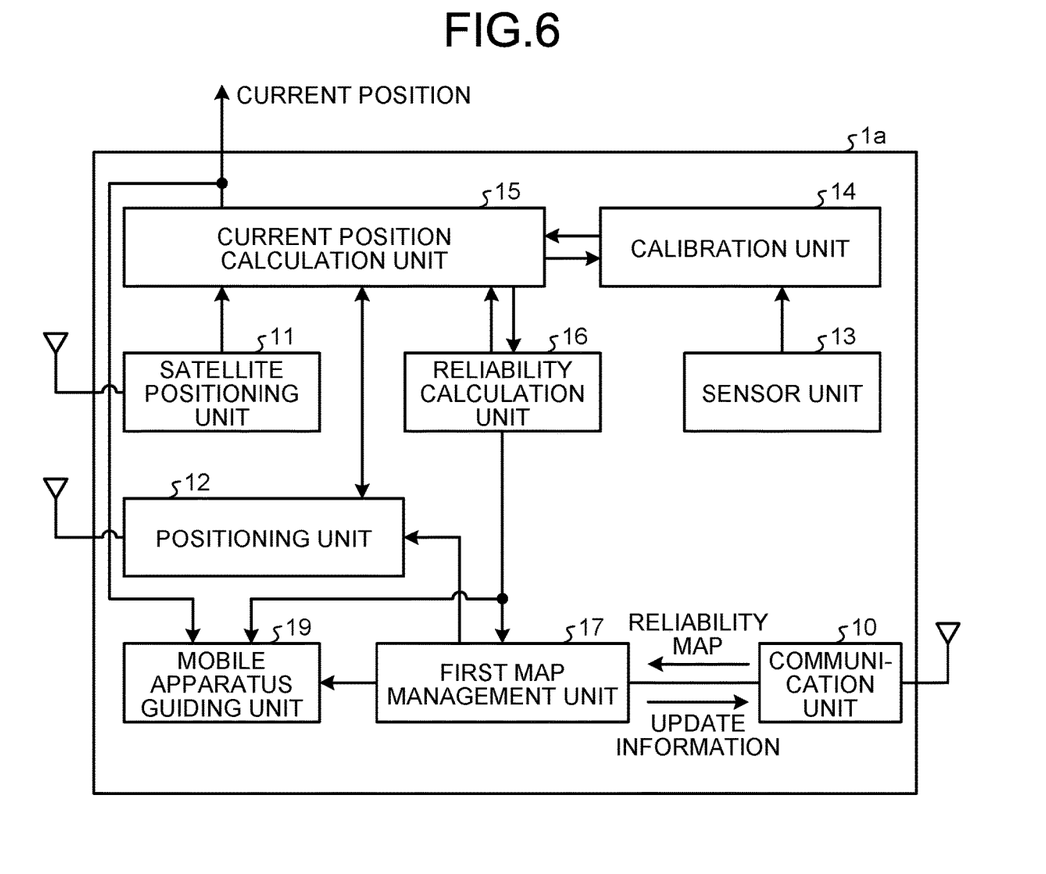
FIG. 6 is a diagram illustrating functional blocks of a mobile apparatus according to a second embodiment.

FIG. 6 is a diagram illustrating functional blocks of a mobile apparatus according to a second embodiment. Note that constituent elements having the same functions as those in the first embodiment are denoted by the same reference signs as those in the first embodiment, and duplicated description will be omitted. A mobile apparatus 1*a* includes a mobile apparatus guiding unit 19 in addition to the configuration of the mobile apparatus 1.

The operation of the mobile apparatus 1*a* will be described. Regarding the positioning performance of the sensor unit 13, error accumulation increases as a longer time elapses after error correction and moving distance increases. When the second reliability becomes smaller than a third threshold, the reliability calculation unit 16 outputs a request to the mobile apparatus guiding unit 19 so as to request the mobile apparatus guiding unit 19 to guide the positioning unit 12 to the positioning area 2. In response to the request, the mobile apparatus guiding unit 19 guides the mobile apparatus 1*a* to a positioning area 2 that is closer to the mobile apparatus 1*a* or a positioning area 2 that is convenient for the mobile apparatus 1*a* by using current position information calculated by the current position calculation unit 15 and reliability map information managed by the first map management unit 17. The positioning area 2 located on a route between a current position of the mobile apparatus 1*a* and a destination or in the vicinity of the route between the current position of the mobile apparatus 1*a* and the destination can be cited as an example of the positioning area 2 convenient for the mobile apparatus 1*a*.

As described above, in the present embodiment, the mobile apparatus 1*a* is guided to the positioning area 2 when the second reliability decreases. Accordingly, it is possible to obtain highly accurate position information, and therefore deterioration in the estimation accuracy of the position information can be prevented.

Third Embodiment

Figure 7:
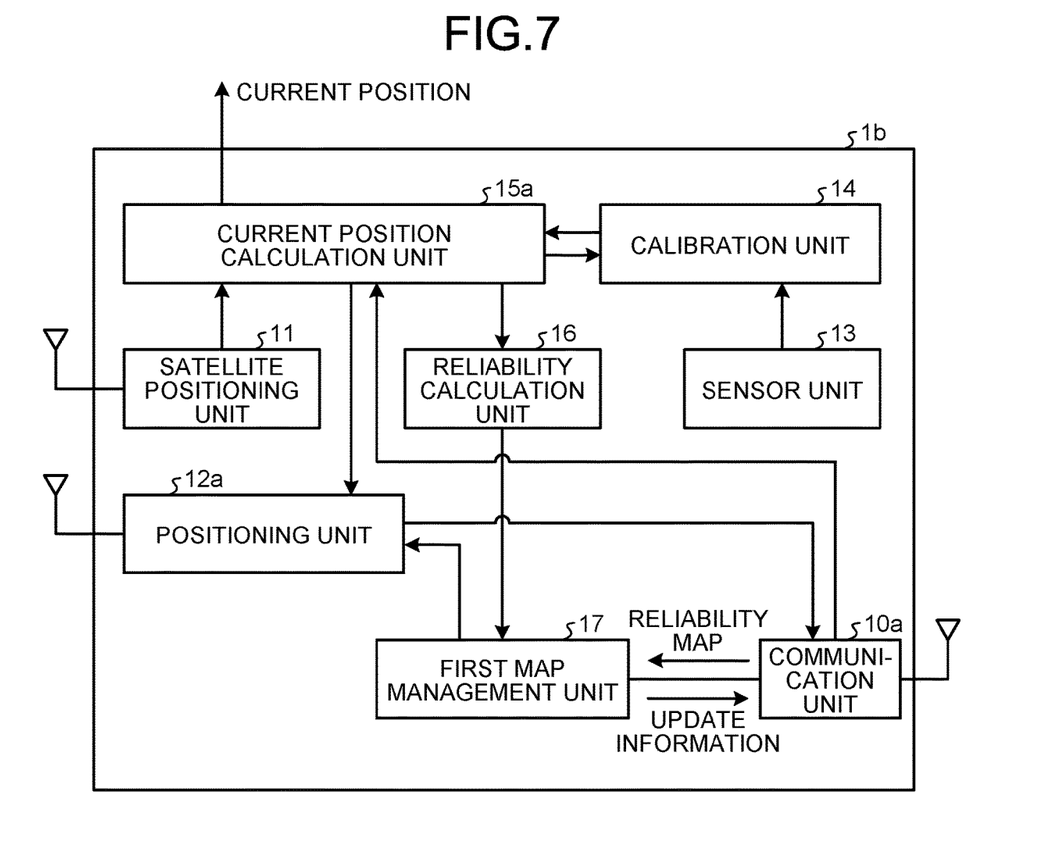
FIG. 7 is a diagram illustrating functional blocks of a mobile apparatus according to a third embodiment.

FIG. 7 is a diagram illustrating functional blocks of a mobile apparatus according to a third embodiment. Note that constituent elements having the same functions as those in the first embodiment are denoted by the same reference signs as those in the first embodiment, and duplicated description will be omitted. A mobile apparatus 1*b* is different from the mobile apparatus 1 in that the mobile apparatus 1*b* includes a communication unit 10*a*, a current position calculation unit 15*a*, and a positioning unit 12*a* in place of the communication unit 10, the current position calculation unit 15, and the positioning unit 12 of the mobile apparatus 1. The communication unit 10*a* outputs information to the current position calculation unit 15*a*. Position information calculated by the positioning unit 12*a* is output to the communication unit 10*a*.

Figure 8:
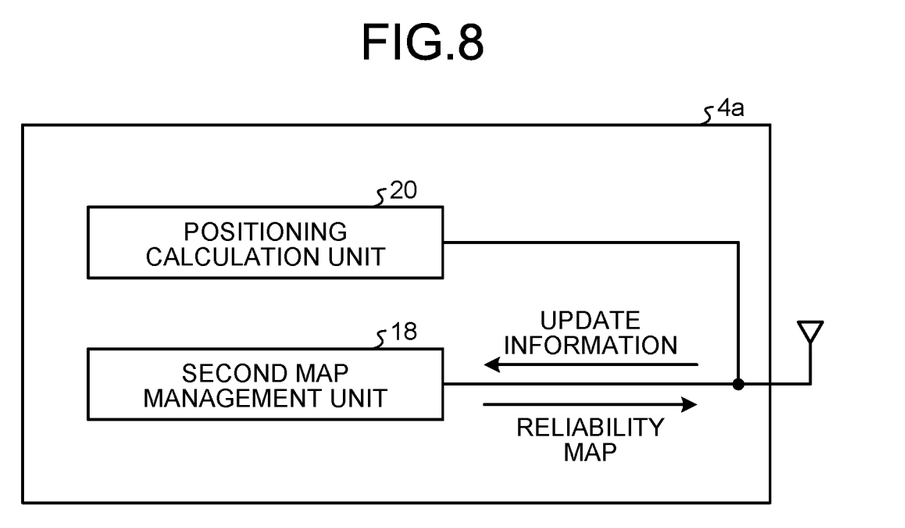
FIG. 8 is a diagram illustrating functional blocks of a map management apparatus according to the third embodiment.

FIG. 8 is a diagram illustrating functional blocks of a map management apparatus according to the third embodiment. A map management apparatus 4*a* includes the second map management unit 18 and a positioning calculation unit 20. The positioning calculation unit 20 calculates a current position of the mobile apparatus 1*b*. In the present embodiment, the map management apparatus 4*a* calculates the position of the mobile apparatus 1*b*. A positioning system 100*a* includes the positioning device 3 and the map management apparatus 4*a*. Note that the positioning system 100*a* is not illustrated for simplification.

The operation of the mobile apparatus 1*b* and the map management apparatus 4*a* according to the third embodiment will be described. It may be more efficient to cause the positioning system 100*a* to perform positioning calculation in a method in which the positioning device 3 measures radio waves or light emitted from the mobile apparatus 1*b* to measure the position of the mobile apparatus 1*b*. In the case where the mobile apparatus 1*b* is in the positioning area 2, the positioning unit 12*a* notifies the map management apparatus 4*a* of the measurement information from the positioning device 3 and a motion vector calculated by the sensor unit 13, via the communication unit 10*a*. Current position information calculated by the map management apparatus 4*a* is transmitted to the mobile apparatus 1*b* via the network, and is notified to the current position calculation unit 15*a*. Note that although FIG. 8 illustrates the case where the positioning calculation unit 20 is included in the map management apparatus 4*a*, the positioning calculation unit 20 may be included in the positioning device 3 or may be installed as another calculation device in the positioning system 100*a*.

As described above, in the present embodiment, the positioning system 100*a* performs positioning calculation, so that it is possible to prevent deterioration in the estimation accuracy of the position information while reducing the processing load of the mobile apparatus 1*b*.

A mobile apparatus according to the disclosure has the effect of preventing deterioration in accuracy of position estimation.

The configurations described in the above embodiments each illustrate an example, and it is possible to combine each configuration with another technique that is publicly known, and is also possible to make omissions and changes to part of each configuration without departing from the gist.

What is claimed is:

1. A mobile apparatus comprising:
    a sensor to calculate a moving distance and a moving direction;
    a map manager to acquire first reliability from a map management apparatus, the map management apparatus managing the first reliability, and the first reliability representing accuracy of positioning information associated with a position;

a positioner to acquire a signal with the positioning information from a positioning device comprising a radio transmitter, determine a calibration area that is an area in which the first reliability is equal to or higher than a first threshold based on the first reliability acquired by the map manager, and calculate a first current position by processing the signal and using the positioning information acquired when the mobile apparatus enters the calibration area;

a current position calculator to estimate a second current position by using the moving distance and the moving direction calculated by the sensor;

a calibrator to use the first current position and a parameter to estimate the second current position in the current position calculator; and a reliability calculator to calculate second reliability that represents accuracy of positioning as determined by the sensor, by using elapsed time from a time when the calibrator performs the calibration and a position to which the mobile apparatus moves from a position when the calibrator performs the calibration, wherein the first reliability represents the accuracy of the positioning information that is transmitted from the positioning device.

2. The mobile apparatus according to claim 1, wherein the current position calculator obtains a coordinate system of a dynamic map that is a map stratified according to speed of change in position of a planimetric feature, and calculates the second current position in the coordinate system of the dynamic map.

3. The mobile apparatus according to claim 2, wherein the parameter is used to correct an error due to a difference between the coordinate system of the dynamic map and a coordinate system of the sensor.

4. The mobile apparatus according to claim 1, wherein the positioner calculates a third current position by using positioning information provided in an area other than the calibration area, and the current position calculator assigns weight to the third current position and the second current position, and estimates a fourth current position by using the weighted third current position and the weighted second current position.

5. The mobile apparatus according to claim 1, wherein when the second reliability is equal to or higher than a second threshold, the reliability calculator updates the first reliability by using the elapsed time and the position to which the mobile apparatus moves.

6. The mobile apparatus according to claim 1, further comprising a mobile apparatus guider to perform guidance such that the positioner is located closer to the calibration area in a case where the second reliability is lower than a third threshold, wherein the reliability calculator notifies the mobile apparatus guider that the second reliability is lower than the third threshold.

7. A management apparatus comprising:

a second map manager to hold a location of one of a plurality of calibration areas that is among areas in which the positioning information for positioning is provided, the one of the plurality of calibration areas being the area in which the first reliability representing the accuracy of the positioning information is equal to or higher than the first threshold; and a positioning calculator to calculate an updated current position corresponding to the second current position of the mobile apparatus according to claim 1, by using the positioning information from the positioning device, and both the moving distance and the moving direction calculated by the sensor.

8. A positioning system comprising:

the management apparatus according to claim 7; and a positioning device to form the one of the plurality of calibration areas for positioning of the mobile apparatus according to claim 1.

9. A control circuit for controlling a mobile apparatus, the control circuit causing the mobile apparatus to perform:

calculating, by a sensor, a moving distance and a moving direction;

acquiring first reliability from a map management apparatus, the map management apparatus managing the first reliability, and the first reliability representing accuracy of positioning information associated with a position;

acquiring a signal with the positioning information from a positioning device comprising a radio transmitter, determining a calibration area that is an area in which the first reliability is equal to or higher than a first threshold based on the first reliability acquired, and calculating a first current position by processing the signal and using the positioning information acquired when the mobile apparatus enters the calibration area;

estimating a second current position by using the moving distance and the moving direction calculated;

calibrating, by a calibrator, a parameter, by using the first current position, to be used to estimate the second current position; and calculating second reliability that represents accuracy of positioning as determined by the sensor, by using elapsed time from a time when the calibrator performs the calibration and a position to which the mobile apparatus moves from a position when the calibrator performs the calibration, wherein the first reliability represents the accuracy of the positioning information that is transmitted from the positioning device.

10. A non-transitory computer-readable recording medium storing therein a program for controlling a mobile apparatus, the program causing the mobile apparatus to perform:

calculating, by using a sensor, a moving distance and a moving direction;

acquiring first reliability from a map management apparatus, the map management apparatus managing the first reliability, and the first reliability representing accuracy of positioning information associated with a position;

acquiring a signal with the positioning information from a positioning device comprising a radio transmitter, determining a calibration area that is an area in which the first reliability is equal to or higher than a first threshold based on the first reliability acquired, and calculating a first current position by processing the signal and using the positioning information acquired when the mobile apparatus enters the calibration area;

estimating a second current position by using the moving distance and the moving direction calculated;

calibrating, by a calibrator, a parameter, by using the first current position, to be used to estimate the second current position; and calculating second reliability that represents accuracy of positioning as determined by the sensor, by using elapsed time from a time when the calibrator performs the calibration and a position to which the mobile apparatus moves from a position when the calibrator performs the calibration,
wherein the first reliability represents the accuracy of the positioning information that is transmitted from the positioning device.

\* \* \* \* \*